United States Patent [19]

Baudoin et al.

[11] Patent Number: 4,464,542
[45] Date of Patent: Aug. 7, 1984

[54] MULTIFUNCTIONAL COMMUNICATION TERMINAL CONNECTED TO TWO TELEPHONE LINES AND WITH PARTIAL REMOTE SUPPLY

[75] Inventors: Michel Baudoin; Jean-Pierre Carru; Yves Veislinger, all of Colombes, France

[73] Assignee: Thomson-CSF, Paris, France

[21] Appl. No.: 449,279

[22] Filed: Dec. 13, 1982

[30] Foreign Application Priority Data

Dec. 18, 1981 [FR] France ............................ 81 23726

[51] Int. Cl.³ .......................................... H04M 11/06
[52] U.S. Cl. .................................. 179/2 C; 179/2 DP
[58] Field of Search ................... 179/2 C, 2 DP, 2 A, 179/2 R, 2 AM, 2 BC, 16 AA, 18 ES, 18 EC, 70, 18 FA, 77

[56] References Cited

U.S. PATENT DOCUMENTS 3,979,559  7/1976  Roedel et al. ............... 179/2 DP
3,984,637  10/1976  Caudill et al. ............... 179/2 DP

OTHER PUBLICATIONS

Japan Telecomm. Rev., vol. 22, pp. 201–209, (1980), Terai et al., "Data Telephone Set".
B.S.T.J., vol. 57, pp. 3487–3502, (Dec. 1978), Baker, W. E. et al., "Transaction Stations".

Primary Examiner—Harold I. Pitts
Assistant Examiner—W. J. Brady
Attorney, Agent, or Firm—Roland Plottel

[57] ABSTRACT

The terminal according to the invention is connected to two telephone lines and comprises a data display means with a data introduction keyboard cooperating with a telephone call signal generator, whereby the latter can transmit calls on either of the two telephone lines, either directly on one line in the case of a mains failure, or via the central processing unit of the display means, when the mains supply is present.

3 Claims, 1 Drawing Figure

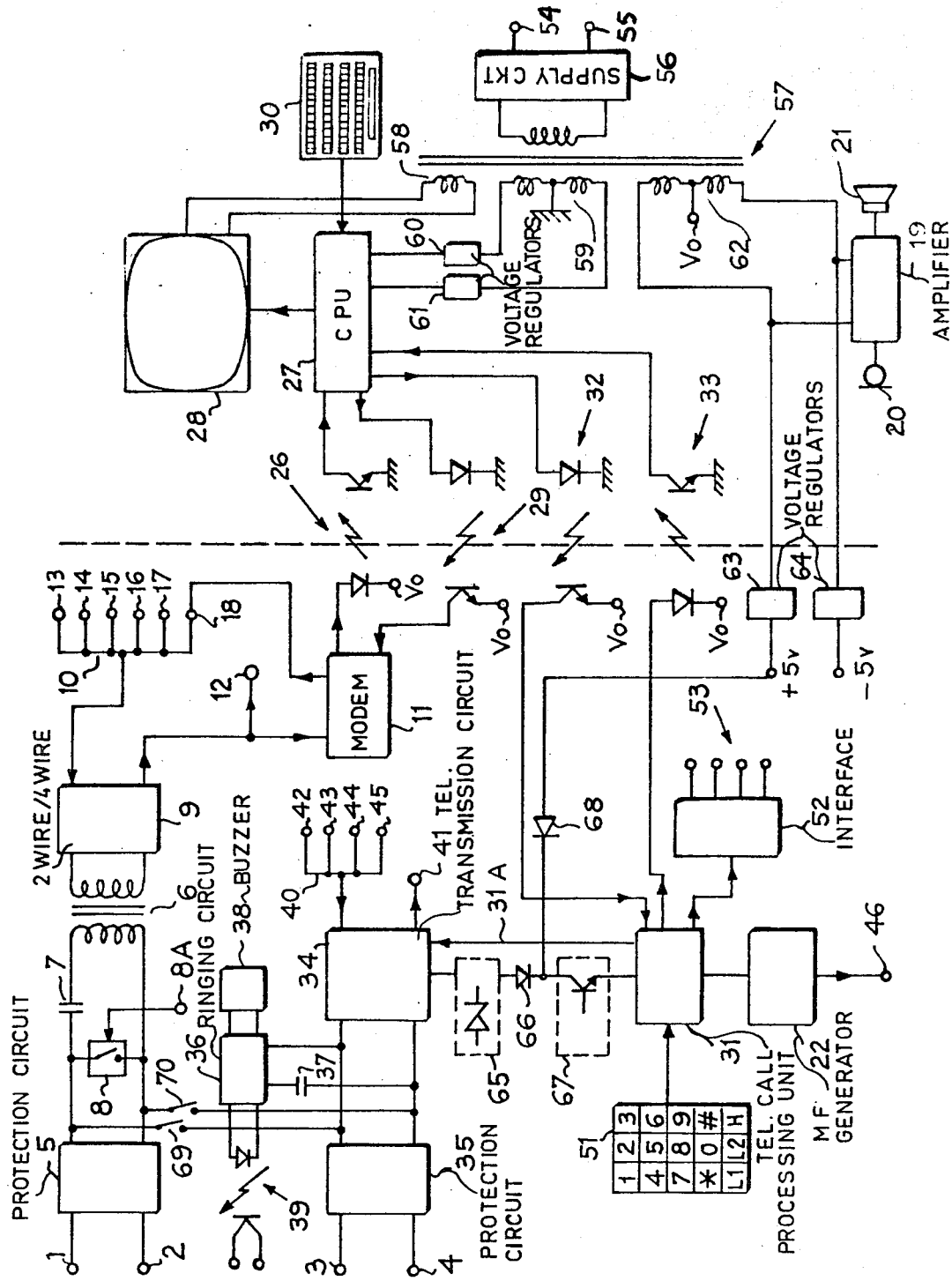

MULTIFUNCTIONAL COMMUNICATION TERMINAL CONNECTED TO TWO TELEPHONE LINES AND WITH PARTIAL REMOTE SUPPLY

BACKGROUND OF THE INVENTION (1) Field of the Invention

The present invention relates to a multifunctional communication terminal connected to two telephone lines and with partial remote supply, hereinafter called MCT.

(2) Description of the Prior Art

The presently used telematic terminals do not offer all the possibilities which could be expected of them and in particular do not make it possible to use the same centralized processing circuits for conventional telephony and for data transmission and data display.

SUMMARY OF THE INVENTION

The present invention relates to a M C T which is able to process both telephony and data, said terminal having the minimum number of components. The invention also relates to a telematic terminal which can be connected to two different telephone lines, whereof one is remotely supplied, in the case of a power failure, which makes it possible to ensure basic telephone services in all situations.

The present invention more specifically relates to a M C T connected to two telephone lines and which is normally supplied with power by power mains, which comprises a data display means controlled by a central processing unit cooperating with a data introduction keyboard, wherein it is connected on the one hand by a modem to the first of the two aforementioned telephone lines and on the other hand to a circuit for generating telephone call signals cooperating with a number dialling keyboard and connected to the second telephone line by an electronic telephone transmission circuit, the current of the second telephone line being able to supply the telephone transmission circuit, the call signal generating circuit and a call detection circuit with a buzzer.

BRIEF DESCRIPTION OF THE DRAWING

The invention is described in greater detail hereinafter relative to a non-limitative embodiment, illustrated by the attached drawing, showing a block diagram of this embodiment.

DESCRIPTION OF THE PREFERRED EMBODIMENT

The M C T shown in the drawing is connected to two different, not shown, telephone lines, connected to terminals 1, 2 and 3, 4 respectively. Terminals 1, 2 are connected to a per se known anti-overvoltage device 5 and comprise, for example, varistors and Zener diodes. The output of device 5 is connected to galvanic insulation transformer 6 via a d.c. component blocking capacitor 7. The output of device 5 is also connected to a loop relay 8, whose control input is connected to a terminal 8A, which is itself connected in not shown manner to the processing circuit described hereinafter. Transformer 6 is connected to a 2 wire-4 wire separating circuit 9, whose signal input on the 4 wire side, is connected to the common contact of an analog selector switch 10. The signal output on the 4 wire side of circuit 9 is connected to the input of a modem 11 (modulator-demodulator). The different individual contacts 13 to 18 of switch 10 are respectively connected, in not shown manner, to the mouthpiece signal output of a listening circuit 19, which is amplified and of the "free hand" type, whose mouthpiece is designated 20 and whose loudspeaker is designated 21, to the output of the mouthpiece of a conventional, not shown, hand set, to the multifrequency notation signal output of a multifrequency generating circuit 22, to an output of the processing unit described hereinafter with a control signal in the form of a low frequency short circuit, and to the output of modem 11. In order not to unnecessarily overcomplicate the drawing, only the connection between the output of modem 11 and contact 18 is shown. The output is respectively connected in not shown manner to the receiver of the hand set via a not shown contactor, to the amplified listening input of circuit 19, and to the signal input of the free hand part of circuit 19.

The demodulated signal output of modem 11 is connected via a photocoupler device 26 to the corresponding input of a centralized processing circuit 27, e.g. the integrated microprocessor circuit 6809. Circuit 27 is connected to a display means 28. The output of the data signals to the modulated of circuit 27 is connected via a photocoupler 29 to the input of the signals to be modulated of modem 11. Circuit 27 is also connected to a conventional data introduction keyboard 30. A data output of circuit 27 is connected to a data input of the telephone call processing circuit 31 via a photocoupler 32. Circuit 31 ensures the performance of the number dialing, the switching of the different signals to be transmitted on the line, and the controls making it possible to converse on one or other line on a free hand basis or not. A data input of circuit 27 is connected to a data output of circuit 31 via a photocoupler 33. Circuit 31, which also cooperates with the multifrequency generator 22, can be a specific integrated circuit, like for example circuit TMS 1200C.

The decimal notation signal output of circuit 31 is connected by a connection 31a to a decimal notation signal injection input of an electronic telephone transmission circuit 34 connected, for example, from a specific integrated circuit, such as integrated circuit ITT 1045M. The 2 wire side of circuit 34 is connected to terminals 3 and 4 via a protection circuit 35, having a higher protection level than circuit 5, circuit 35 having, for example, lightning arrester means, in addition to Zener diodes and varistors. The output of circuit 35 is also connected to a ringing detector 36 via a d.c. component stopping capacitor 37. The ringing detector 36 is connected on the one hand to a buzzer 38, which only operates in the case of a failure of the mains supplying the terminal. Ringing detector 36 is also connected to a photoemissive diode of a photocoupler 39, whose phototransistor is connected, in not shown manner, to a ringing device, which can be a musical sound generator having a plurality of sounds controlled by circuit 31 and included in the amplified listening circuit 19.

On the 4 wire side of circuit 34, the low frequency signal input is connected to a selector switch 40. The different individual contacts 42 to 45 of switch 40 are respectively connected, in not shown manner, to output 46 of generator 22, to the mouthpiece of the hand set and to mouthpiece 20. Output 41 on the 4 wire side of circuit 34 is respectively connected to the receiver of the hand set, to the amplified listening circuit and to the free hand part of circuit 19.

Processing circuit 31 cooperates with a number dialling keyboard 51 having the ten standard keys of such a keyboard and a plurality of function keys, comprising in particular a key L1 and a key L2 for connecting the terminal to the first line or second line (leading respectively to terminals 1,2 and 3,4) and a hold key. Circuit 31 also cooperates with an interface 52 provided, for example, by circuits MC 40174, whereof the different outputs 53 control, in not shown manner, switches 10 and 40, as well as the various relays, such as for example the connection relay of the first telephone line, the branching relay of the hand set to the first or second telephone lines, etc. The mains of the terminal reaches terminals 54 and 55, to which is connected a supply circuit 56, preferably a cutoff supply circuit. Circuit 56 is connected to the primary of a galvanic transformer 57, whereof a first high voltage secondary 58 supplies the display 28. A second secondary 59 of transformer 57 supplies, across voltage regulators 60, 61, circuit 27 with symmetrical voltages, of e.g. +5 v and −5 v, the centre of winding 59 being connected to the earth of the terminal. Transformer 57 has a third secondary 62, whose centre is connected to a floating potential Vo, said winding being connected to two voltage regulators 63, 64, supplying the telephone circuits of the terminal with regulated, symmetrical voltages with respect to Vo, e.g. of +5 v and −5 v. It should be noted that in photocouplers 26, 29, 32, 33, the photodiode or phototransistor, whereof one electrode is connected to circuit 27, are also connected to earth, whilst the components having an electrode connected to the telephone circuit are also connected to the floating potential Vo.

Part of the energy supplied by the line current is taken from transmission circuit 34 and is passed to circuit 31 via a current stabilization circuit 65, a diode 66 connected in the conductive direction and a voltage regulating circuit 67. Moreover, the output of regulating circuit 63 is connected by a diode 68, connected in the conductive direction, to the input of regulating circuit 67. Circuit 65 supplies at its output a voltage which is slightly below that supplied by regulating circuit 63. In an embodiment, the output voltage of circuit 64 is 4 v, whilst the voltage supplied by circuit 63 is 5 v. Thus, when the mains voltage supplying terminals 54 and 55 is present, diode 66 is blocked and circuit 31 is supplied by the mains via circuit 63 and diode 68. When the mains voltage is absent, diode 66 becomes conductive and part of the line current is used for supplying circuit 31, whereof the nominal supply voltage must be below the voltage supplied by circuit 65. In the aforementioned embodiment, the supply voltage of circuit 31 is typically 4 v.

In the case of the embodiment described hereinbefore, and in the presence of the mains voltage, calls coming from the outside can only be routed by the telephone line connected to terminals 3 and 4, whilst calls to the outside can be routed by one or other of the two telephone lines to which the terminal is connected. The external calls routed by the line connected to terminals 3 and 4 are processed by ringing detector 36, which transmits to circuit 31 the ringing instruction via photocoupler 39 in the presence of the mains supply, buzzer 38 being inhibited. As soon as a mains failure occurs, buzzer 38 is no longer inhibited and the user of the terminal can reply to an incident call by using the hand set. It should be noted that the mains supply, apart from supplying circuits 27 and 28, supplies the amplified listening, free hand, ringing, number dialling of line connected to terminals 1,2 and, if appropriate, the bell function of keyboard 30.

When the user of the terminal wishes to call on one of the two telephone lines available to him and the mains supply is present, he selects one of the two lines on keyboard 51 and dials thereon his number, which is accepted by circuit 31 and transformed into decimal pulses or multifrequency signals, according to the case in question. If the mains supply disappears, circuit 31 directly transmits the data corresponding to circuit 34 routed on this line. When the mains supply voltage is present, circuit 31 firstly transmits the data from keyboard 51 via photocoupler 33 to circuit 37, which stores it. Circuit 27 then transmits the corresponding instruction via photocoupler 32 to circuit 31. If, for example, the requested subscriber's line is engaged, circuit 27 effects the automatic recommencement via photocoupler 32.

Data, other than telephone conversations, pass via circuit 27 and modem 11 and via the line connected to terminals 1 and 2. This data exchange on the telephone line is well known per se and need not be described in detail.

The output of circuits 5 and 35 are connected in parallel via two contacts 69, 70 of a switch, e.g. a manual switch, said contacts normally being open. If there is only a single telephone line available, these contacts are closed and the line is connected to terminals 3 and 4. If the mains voltage is present, the circuits connected to the line reaching terminals 1 and 2 are used for the transmission of data and speech. The other line, reaching terminals 3 and 4, is normally insulated by the contacts of a line taking relay (not shown). When there is a mains failure, only speech transmission is automatically ensured by the circuits connected to terminals 3 and 4.

What is claimed is:

1. A multifunctional communication terminal connected to two telephone lines and which is normally supplied with power by power mains, which comprises a data display means controlled by a central processing unit cooperating with a data introduction keyboard, wherein said terminal is connected by a modem to the first of said two telephone lines and to a circuit for generating telephone call signals cooperating with a number dialling keyboard and connected to the second telephone line by an electronic telephone transmission circuit, the current of the second telephone line being able to supply the telephone transission circuit, the call signal generating circuit and a call detection circuit with a buzzer.

2. A terminal according to claim 1, in which the telephone call signal generating circuit cooperates with a telephone line selection device, said generating circuit being connected via a multifrequency generating circuit to the telephone transmission circuit, and to the central processing unit, wherein when the mains voltage is present, the telephone call signals are processed by the central processing unit via the call signal generating circuit, whilst when the mains voltage is absent, the telephone call signals are transmitted to the telephone transmission circuit.

3. A terminal according to claim 1, wherein circuits for supplying power from the mains to the telephone call signal generating circuit are galvanically separated from circuits for supplying power to the other circuits of the terminal, and wherein data transmission between the telephone call signal generating circuit and the central processing unit, as well as between the latter and the telephone line takes place via photocouplers.

* * * * *